2 Sheets—Sheet 1.

I. J. HILGERD.
CRACKER-MACHINE.

No. 183,565. Patented Oct. 24, 1876.

Witnesses:
E. G. Ward.
D. J. Tapley.

Inventor
Ignatz Joseph Hilgerd

I. J. HILGERD.
CRACKER-MACHINE.

No. 183,565. Patented Oct. 24, 1876.

Witnesses:
E. G. Stavd.
D. J. Tapley

Inventor:
Ignatz Joseph Hilgard

UNITED STATES PATENT OFFICE.

IGNATZ J. HILGERD, OF BROOKLYN, NEW YORK.

IMPROVEMENT IN CRACKER-MACHINES.

Specification forming part of Letters Patent No. 183,565, dated October 24, 1876; application filed November 6, 1875.

*To all whom it may concern:*

Be it known that I, IGNATZ JOSEPH HILGERD, of the city of Brooklyn, county of Kings, and State of New York, have invented a new and useful Improvement in Cracker-Machines, which improvement is fully set forth in the following specification:

This invention relates to that class of machines which are designed for forming and molding crackers from dough; and it consists in the use of two cylindrical rollers, each provided with half-molds cut upon their face, the two, by joint action, forming a complete mold, and operating in connection with an improved ejecting device inserted in the lower cylinder which delivers the molded crackers to the carrying-belts, which, in turn, deliver them to the baking-pans, the construction, application, and operation of all of which will be herein fully pointed out and described.

Figure 1:
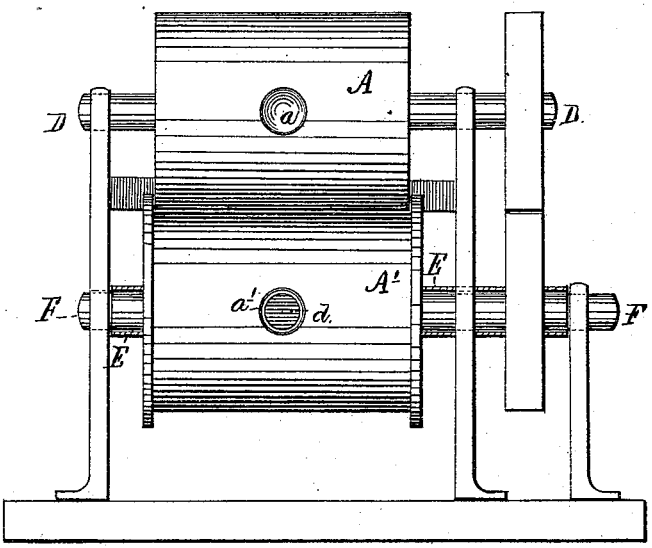
Figure 2:
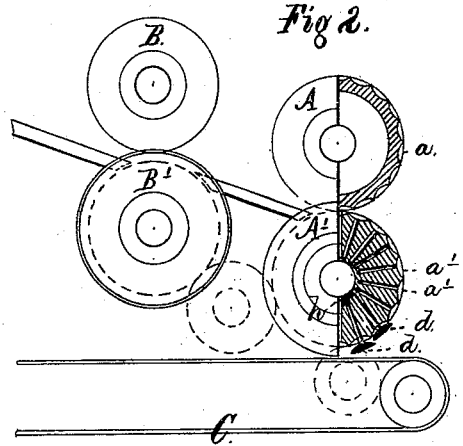
Figure 3:
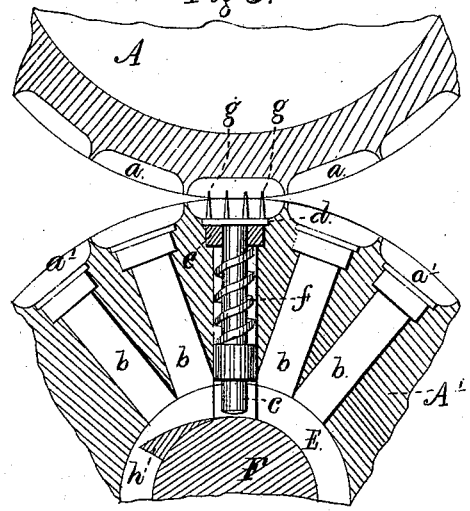
Figure 4:
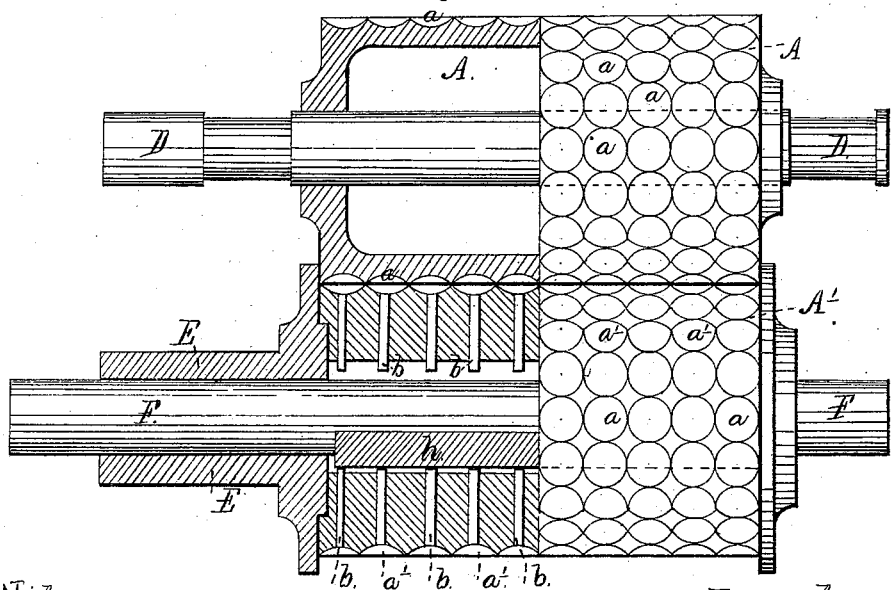

In the drawings, which form an essential part of this specification, Figure 1 is a front elevation of a machine embodying my invention. Fig. 2 is an end view of the same, partially in section, and with the frames and bed removed. Fig. 3 is an enlarged sectional end view of the molding-rolls; and Fig. 4 is a front view of the same, partially in section.

Similar letters of reference in the various drawings will indicate corresponding parts.

It is a well-known and established fact that in all cracker-machines now in use much serious difficulty is found in delivering the crackers from the molds, the dough from which they are formed having a tendency to cling to the surface of the molds, which it is impossible to entirely overcome. This necessitates much careful attention, and frequently calls for hand-labor to remove the crackers from the molds. This difficulty also lessens the speed of the machine and the consequent production thereof.

It is to obviate and overcome these troubles, and to absolutely insure the perfect and rapid delivery of the molded crackers, that I have made the present invention. I accomplish this purpose by means of two molding-cylinders, one half of each mold being formed on the periphery of each, which meet during the revolutions of the cylinders, forming a complete mold, and by the use in connection therewith, of a reciprocating capped plunger inserted in the base of the molds in the lower molding-roll. This capped plunger is thrown out at the proper moment by means of a cam, thus ejecting the crackers from the molds. The usual air-holes may be formed in the cracker at the same time, by means of suitable pins projecting from the face of the ejecting-plunger.

A and A' are the usual molding-rollers, having formed on their periphery the molds $a$ and $a'$, one-half of each mold being on each cylinder. B and B' are the usual feeding-rolls for delivering the dough, rolled to proper thickness, to the molding-cylinders A and A'. C is a carrying-belt, which receives the crackers when ejected from the molds and delivers them to the baking-pans. The dotted lines in Fig. 2 show the various gears, by means of which the various parts of the machine are operated together. The feeding-rolls, gearing-frames, tables, &c., being of the usual form of construction, call for no detailed description here.

The two molding rolls or cylinders are so geared that they revolve in unison, the half of the molds upon each meeting and forming a complete mold as they pass at the point of contact, as shown plainly in Fig. 3. The upper roll is attached fast to the shaft D, and the lower roll to a sleeve that encircles the shaft F, which is a stationary and fixed shaft. In each or from each of the molds $a'$ on the lower roll A', at their center, is drilled a hole, $d$, of suitable diameter, extending to the center of the roll, as shown plainly in Figs. 3 and 4. In each of these holes is inserted a rod or shaft, $c$, (see Fig. 3,) which rests on the surface of the shaft F. In the base of the molds $a'$, and sunk below their surface, is placed a cap or plunger, $d$, which is attached to the top of the rod or shaft $c$, and rests on the packing-ring $e$, through which the shaft plays. A spiral spring, $f$, encircles the shaft $c$ and serves to keep it down in place on the shaft F. To the top of the cap or plunger $d$ may be attached a number of pointed pins, $g$, for the purpose of puncturing the cracker with "air-holes." Upon the shaft F is affixed a cam, $h$, over which, as the roll A' revolves, the shafts or pins $b$ will rise, thus throwing the plunger d up and out of the molds $a'$, as shown distinctly in Fig. 2. As the pins pass the cam, they at once fall, by action of the spring $f$, into their first position. It is obvious that this operation will not only eject the cracker from the lower mold, after it is formed by the action of the two molding cylinders, but punctures the same with the usual air-holes. It is also plainly apparent that the action of the machine will be rapid and continuous, and require no attention other than that necessary to feed it with dough and to remove the crackers to the ovens.

Having thus fully described my invention, what I claim as new, and desire to secure by Letters Patent, is—

1. In a cracker-machine, the combination of feeding-rolls B B′, carrying-belt C, the molding-cylinder A, provided on its periphery with the half-mold $a$, and the cylinder A′, having having formed on its periphery the half-mold $a'$, the two meeting at a point during their revolution and, by joint action upon the dough, molding a cracker therefrom, substantially in the manner as herein shown and set forth.

2. In a cracker-machine, the combination of feeding-rolls B B′, conveying-belt C, the upper molding-cylinder A, having half-molds $a$, and the lower molding-cylinder A′, having half-molds $a'$, each of which is provided with ejectors $d$, operated by the shafts $f$ and cam $h$, the whole arranged for joint operation, substantially as and for the purposes as herein shown and set forth.

In testimony whereof I have hereunto set my hand.

IGNATZ JOSEPH HILGERD.

In presence of—
A. L. MUNSON,
C. R. ATWATER,
ANTHON NELSON.